(12) United States Patent
Reid (10) Patent No.: US 8,596,164 B2
(45) Date of Patent: Dec. 3, 2013

(54) ENGINE AND TRANSMISSION COUPLING SYSTEM AND METHOD

(76) Inventor: Dennis Reid, Pleasant Hill, CA (US)

( * ) Notice: Subject to any disclaimer, the term of this patent is extended or adjusted under 35 U.S.C. 154(b) by 1790 days.

(21) Appl. No.: 11/447,625

(22) Filed: Jun. 6, 2006

(65) Prior Publication Data

US 2007/0137421 A1 Jun. 21, 2007

Related U.S. Application Data

(60) Provisional application No. 60/739,606, filed on Nov. 23, 2005.

(51) Int. Cl.
*F16H 57/02* (2012.01)

(52) U.S. Cl.
USPC .................................................... 74/606 R

(58) Field of Classification Search
USPC ............. 74/572.2, 606 R; 123/179.22, 192.1; 322/4
See application file for complete search history.

(56) References Cited

U.S. PATENT DOCUMENTS

| | | | | |
|---|---|---|---|---|
| 2,647,596 A | * | 8/1953 | Cook | 192/70.13 |
| 3,613,481 A | * | 10/1971 | Lapinski | 475/116 |
| 4,478,593 A | | 10/1984 | Brown | |
| 4,641,547 A | | 2/1987 | Stich et al. | |
| 5,299,880 A | | 4/1994 | Bouchard | |
| 5,342,242 A | * | 8/1994 | Ladd et al. | 464/98 |
| 5,457,883 A | * | 10/1995 | Swenson, Sr. | 29/888.01 |
| 5,524,508 A | | 6/1996 | Peters | |
| 5,566,591 A | | 10/1996 | Burkett | |
| 2003/0005792 A1 | * | 1/2003 | Ninomiya et al. | 74/572 |
| 2007/0277644 A1 | * | 12/2007 | King et al. | 74/572.2 |

* cited by examiner

*Primary Examiner* — Vicky Johnson
(74) *Attorney, Agent, or Firm* — Robert L. Wolter, Esq.; Beusse Wolter Sanks Mora & Maire, P.A.

(57) ABSTRACT

A flexplate comprising a single integral body portion having a generally circular shape. One or more borings are formed in the body portion for receiving an end of a crankshaft of the engine on a first side of the body portion and for receiving a torque converter of an unrelated transmission on a second side of the body portion. Apertures may be formed in the body portion and positioned on the flexplate for alignment with corresponding apertures on a flange mounted to the end of the crankshaft and apertures on the torque converter.

38 Claims, 6 Drawing Sheets

ENGINE AND TRANSMISSION COUPLING SYSTEM AND METHOD

CROSS REFERENCE TO RELATED APPLICATION

This application claims priority of Provisional Patent Application Ser. No. 60/739,606, filed on Nov. 23, 2005, which is incorporated herein by reference.

BACKGROUND OF THE INVENTION

This invention relates generally to automatic transmission systems of motor vehicles, and more particularly automobiles. More specifically, this invention pertains to the coupling of an engine to a transmission that is unrelated to the engine.

Most automobiles manufactured today include automatic transmissions that have replaced the traditional manual transmissions. An automatic transmission typically includes a torque converter in place of the clutch of the manual transmission. A torque converter is a type of fluid coupling between the engine and the transmission to allow the engine to run somewhat independent of the transmission. The torque converter enables the engine to continue to operate while the engine idles or the automobile is stopped.

Figure 1A:
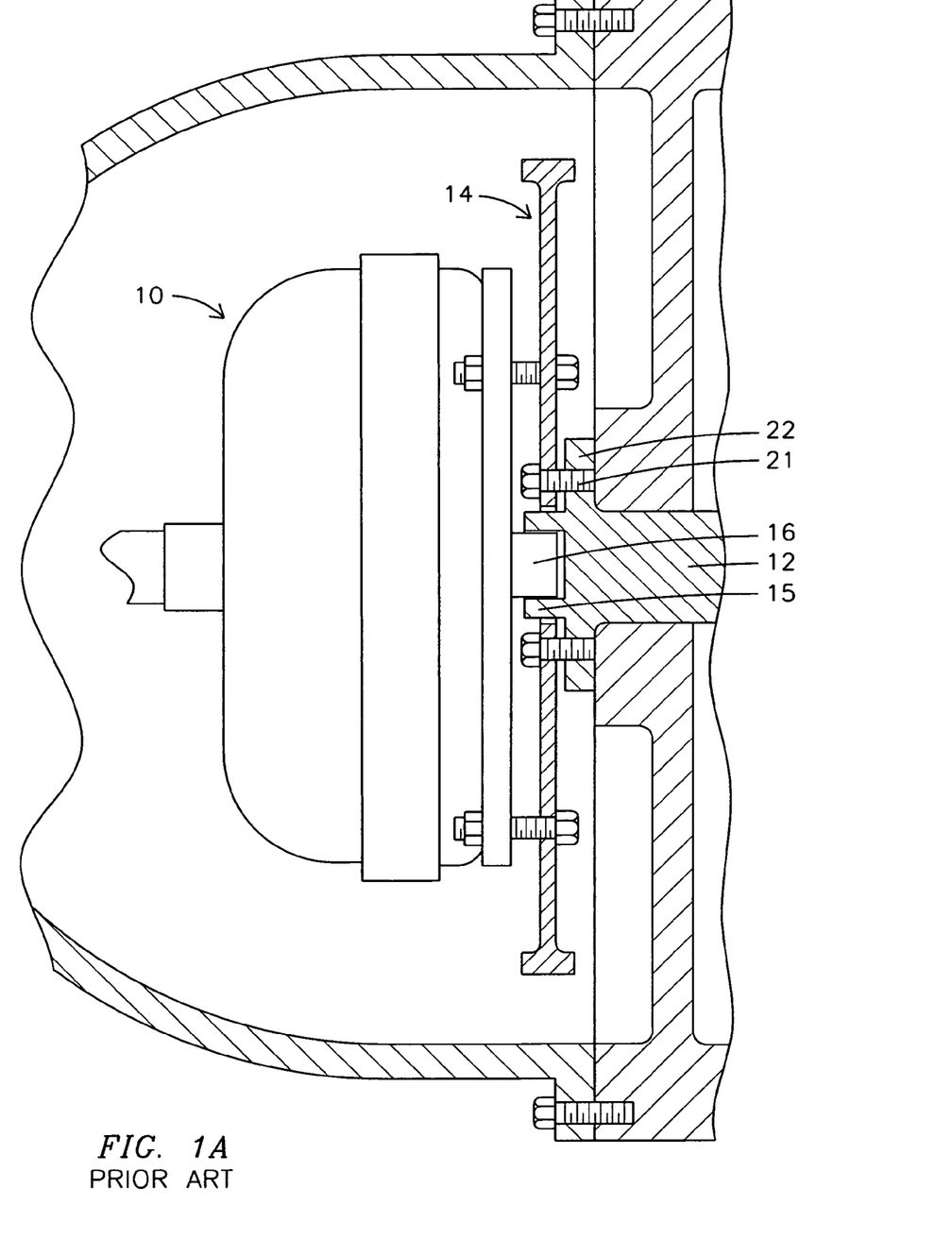
FIG. 1A is a top sectional view of a transmission coupled to an engine.

A flexplate, also occasionally referred to as a flywheel, connects the torque converter to an engine crankshaft. A typical coupling arrangement of a flexplate 14, engine crankshaft 12 and torque converter 10 is shown in FIG. 1A. The flexplate 14 is placed on the end of the crankshaft 12 whereby a hub 15 on the end of the crankshaft 12 extends through a centered boring on the flexplate 14. Flexplate 14 is bolted to the crankshaft 12 using bolts 21 threaded into apertures on a flange 22 disposed on the end of the crankshaft 12. The torque converter 10 has a hub 16 that is inserted into the hub 15 on the crankshaft 12, and the torque converter 10 is bolted to the flexplate 14. The flexplate 14 is secured to both the crankshaft 12 and the torque converter 10 so the torque converter 10 rotates at substantially the same rate of speed as the flexplate and crankshaft. In addition, a gear section, or ring gear on the flexplate engages a starter to initiate rotation of the flexplate when the engine is started.

In racing applications or after-market modifications of automobiles, an engine produced by a particular manufacturer is often times coupled to a transmission produced by another manufacturer, or an engine and transmission are matched whereby the transmission cannot be directly coupled to the engine. In such circumstances, the components, namely the torque converter, crankshaft and/or flexplate, do not match one another for purposes of installation or operation. The traditional methods of coupling the transmission to the engine include providing a flexplate from either the engine or transmission. In addition, one or more adaptor components such as spacers, mounting hubs, tubular standoffs etc., are provided, and sometimes original parts are re-tooled in order to mate the transmission to the engine.

Figure 1B:
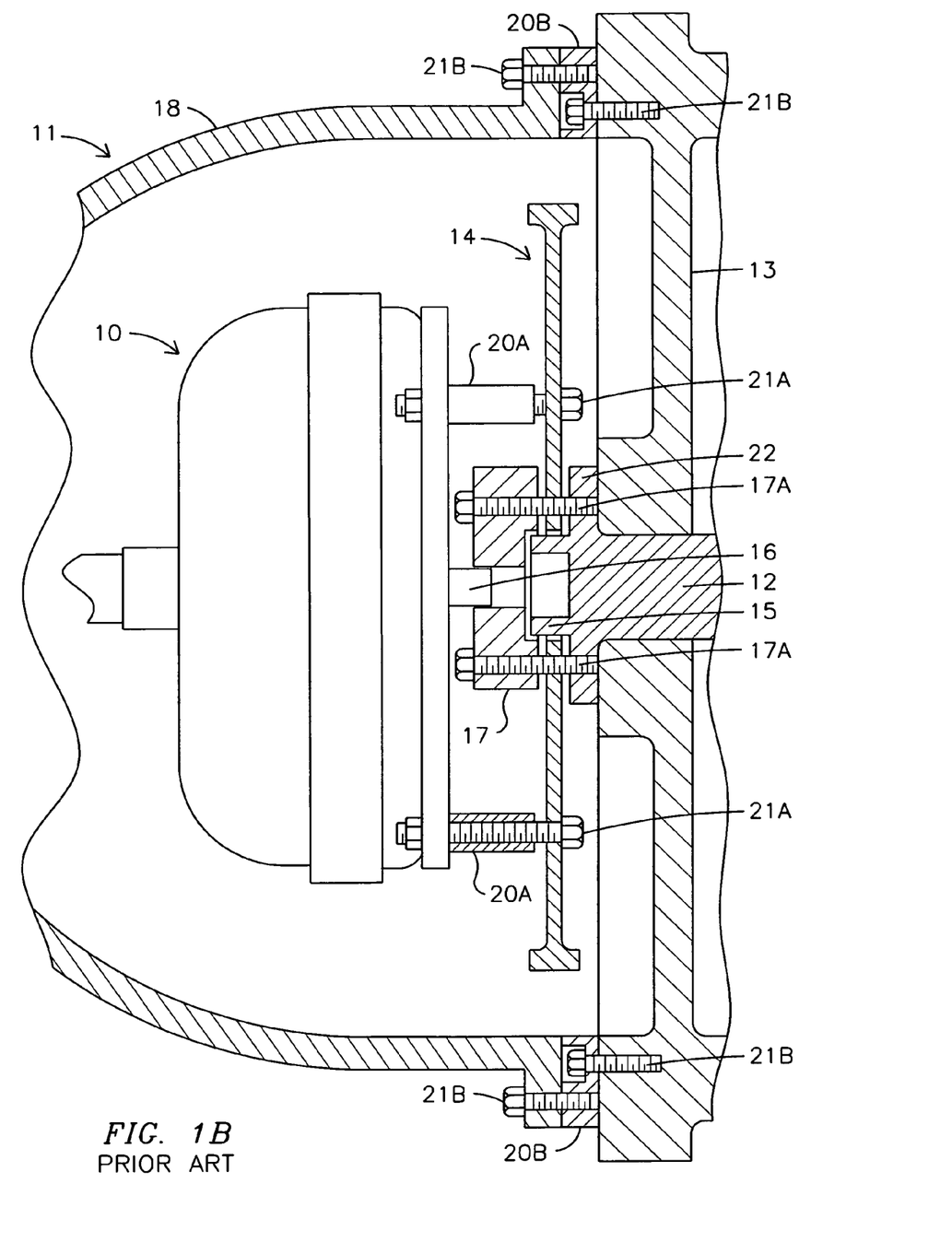
FIG. 1B is a top sectional view of a prior art adaptor kit coupling an engine and unrelated transmission.

An example of a prior art adaptor assembly for coupling a transmission to an engine is illustrated in FIG. 1B. In this example, a flexplate 14 from the engine 13 and various adaptors or spacers couple a transmission 11 and torque converter 10 to the engine 13 and engine crankshaft 12. The crankshaft 12 has a pilot hub 15 and flange 22 for respectively aligning and mounting the flexplate 14 to the end of the crankshaft 12. The torque converter 10 and transmission 11 are unrelated to the engine 13 and engine crankshaft 12 as they are produced from a manufacturer other than the manufacturer of the engine 13. Accordingly, the torque converter 10 cannot be mated with the engine crankshaft 12 or secured to the flexplate 14 without adaptors. In this example, the torque converter hub 16 is too small in diameter to properly mate with the hub 15 on the crankshaft 12.

Accordingly, a hub adaptor 17 is mounted to the flexplate 14 and crankshaft 12 using crankshaft bolts 17A, for receiving the torque converter 10. In some adaptor kits, the adaptor hub 17 may be purchased in an assembled fashion, whereby the hub adaptor 17 is already bolted or welded to the flexplate 14. The hub adaptor 17 displaces the transmission 11 and torque converter 10 aft of the vehicle in which the transmission 11 and engine 13 will be mounted. Therefore, spacers 20A, 20B and bolts 21A, 21B must be used to respectively mount the torque converter 10 to the flexplate 14 and the transmission bell housing 18 to the engine 13. Moreover, adaptor 20B between the bell housing 18 and engine 13 accounts for the misalignment of apertures on the bell housing 18 with respect to apertures on the engine 13.

The adaptor systems or kits, as shown in FIG. 1 and described above, have various components that must be properly aligned and bolted together. Assembling such a system can be time consuming and difficult. The components can be lost during assembly or misaligned when assembled. In as much as the components are bolted to one another or to the transmission and engines, as the automobile engine runs the bolts often loosen and sometimes break.

Alignment, true running, and squareness of the engine/transmission assembly are important in production vehicles; however, as the performance demands increase, accuracy becomes increasingly critical. Heavy loads and higher engine speeds exaggerate all problems associated with alignment issues. Unchecked, these problems result in failed engines and transmissions due to excessive forces created during operation.

Each part of a motor vehicle engine and transmission must have an allowable machining tolerance on its size. When multiple parts are assembled together, all of the sizes, misalignments, and non-squareness tolerances (errors) start to add up. Even with precision machining and assembly, more parts translate to more opportunities for more misalignments.

To further aggravate the problem, whenever parts are bolted together, additional clearances must be designed in to provide clearance for the fasteners to fit. When more parts are bolted together individually, or when sandwiched between a single set of bolts, each bolt joint becomes susceptible to movement between the faces of the bolted parts due to vibration, cyclic loading, or even temperature variations. Once parts start to chafe or the bolt tightness begins to loosen, the bolt faces of the parts rapidly begin to wear and become even looser allowing misalignment or even wobbling and unbalance. The whole system can quickly and catastrophically fail at that point.

In an attempt to solve bolting/clamping problems with multiple part connections, welding is sometimes employed. Welding creates it own set of characteristic problems. The two most common problems are distortion and weld induced residual stresses. Since welding is the act of melting metal in multiple parts together, as the melted areas start to cool, they shrink and distort which warps, twists, and bends the previously straight parts making squared and aligned finished products virtually impossible. The second problem is that welding changes the metallurgical properties of the parts and differing cooling rates of the parts create residual stresses, which limit the amount of load that can be applied to the parts before they break.

SUMMARY OF THE INVENTION

The present invention for a system or method for coupling an engine to a transmission unrelated to the engine comprises a flexplate having a first side coupled to an engine and a second side coupled to a transmission. The term "unrelated" as used in this disclosure means a transmission that is produced by a manufacturer that is not the same manufacturer of the engine, or the transmission cannot be directly mated with the engine without the use of adaptors. To that end the engine is also unrelated to the transmission. In addition, the term flexplate also incorporates the term or component flywheel, which are used interchangeably by those skilled in the art.

The flexplate comprises a single integral body portion having a generally circular shape. One or more borings are formed in the body portion for receiving an end of a crankshaft of the engine on a first side of the body portion and for receiving a torque converter of the unrelated transmission on a second side of the body portion. The term integral as used herein means a part that is machined, forged, cast or otherwise fabricated as a single part without other parts or components welded, pressed or otherwise added to perform its intended function. The term homogenous may be used interchangeably with integral.

Apertures may be formed in the body portion and positioned on the flexplate for alignment with corresponding apertures on a flange mounted to the end of the crankshaft and apertures on the torque converter. A first set of apertures in the body portion is spaced radially outward from the boring and spaced circumferentially around the boring for mounting the flexplate to the crankshaft, and, a second set of apertures in the body portion is spaced radially outward from the boring for mounting the torque converter to the flexplate. After the apertures of the respective components are aligned, bolts are used to secure the flexplate to the engine crankshaft and the torque converter to the second side of the flexplate.

In as much as the flexplate is fabricated as an integral unit having a first side that mates with an engine crankshaft, and a second side that mates with a transmission that is unrelated to the engine, various adaptors used in the prior art are not required to couple the engine and transmission.

In one embodiment, the system may also include a transmission bell housing that is directly mounted to the engine. The bell housing comprises a flange integrally formed on an end of the housing and has a configuration that matches or corresponds to a flange integrally formed on the end of the engine block. The flange on the bell housing includes a plurality of apertures spaced apart along the flange and each of the apertures is aligned with a corresponding aperture on engine flange. In addition, the bell-housing flange has height and/or width dimensions that correspond to or are the same as such dimensions of the engine flange. In this manner, adaptor plates or spacers used to mount together the transmission housing of the unrelated transmission and the engine are not required.

This invention advances the art by combining all of the various adapter parts into a single homogeneous unit. The features of the part are all machined at one time so the face, bore, diameter, concentricity and squareness issues essentially disappear, and the part is typically inherently balanced even with less than precision machining. Making a homogenous part from one component also means that the metallurgy and expansion rates due to temperature changes are the same. Along the same lines, vibration and clamping forces act on only one joint so the chances of loosening or bolt breakage are significantly lessened.

Often times, the previously described adapter kits utilize fitted parts that press into each other. Precise machining is required for these parts to fit tightly. Due to temperature variations, use, or installation and removal, the fitted parts can become loose and not remain in their required locations, which can again result in catastrophic failures.

Racing applications create an even greater opportunity for improvement in the art because maintenance becomes an issue. When parts fail at a race, there is a frantic repair rush between rounds in elimination type racing such as drag racing or pit stops during the actual race such as circle track and off-road racing. Specially fitted parts must be installed in exactly the correct locations, each bolt must be tightened exactly, shims must be installed, and care must be taken not to lose any parts or install them in the wrong order and location. This is hard enough to do during normal maintenance, but during a pressure situation in the middle of race, it is very easy to make mistakes.

A system consisting of a homogeneous flexplate body portion and bell housing matching an engine consists of only one or two parts along with a few bolts. Installation is quick and error free even under the most stressful situations.

DESCRIPTION OF THE DRAWINGS

A more particular description of the invention briefly described above will be rendered by reference to specific embodiments thereof that are illustrated in the appended drawings. Understanding that these drawings depict only typical embodiments of the invention and are not therefore to be considered to be limiting of its scope, the invention will be described and explained with additional specificity and detail through the use of the accompanying drawings.

DESCRIPTION OF THE INVENTION

The invention for a flexplate 30 is illustrated in FIGS. 2 through 6. The flexplate 30 is shown in cooperation with an engine 37 and unrelated transmission 38 in FIGS. 7 and 8. The flexplate 30 includes a disc-like body portion 31 that has a generally circular shape. The flexplate 30 has a first side 32 (or the engine side) to which engine 37 is coupled, and a second side 33 (or the transmission side) to which the transmission 38 is coupled. Gear teeth 34 are disposed along a periphery of the body portion, and engage a starter (not shown). The gear teeth 34 may be machined into the body portion 31, or mounted to body portion using known methods such as welding or press fitting a gear ring on to the body portion 31.

A boring 52 is formed through the center of the body portion 31, and web section 64 that is disposed intermediate the boring 52 and gear teeth 34. On the first side 32 of the body portion 31, the boring 52 receives a first pilot hub 40 mounted on an end of a crankshaft 39 of the engine 37. On the second side 33 of the body portion 31, the boring 52 receives a second pilot hub 46 mounted on a torque converter 44 of the unrelated transmission.

Figure 2:
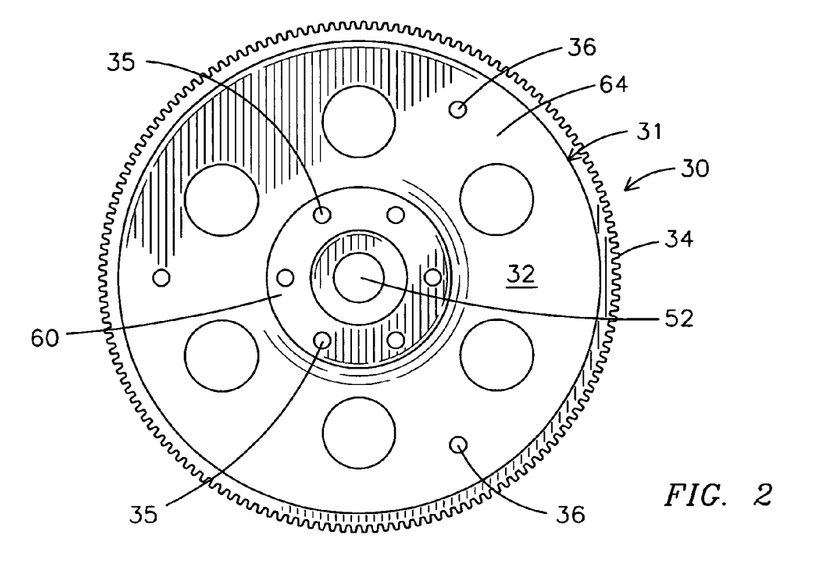
FIG. 2 is an elevational view of a first side, or engine side, of the flexplate.
Figure 3:
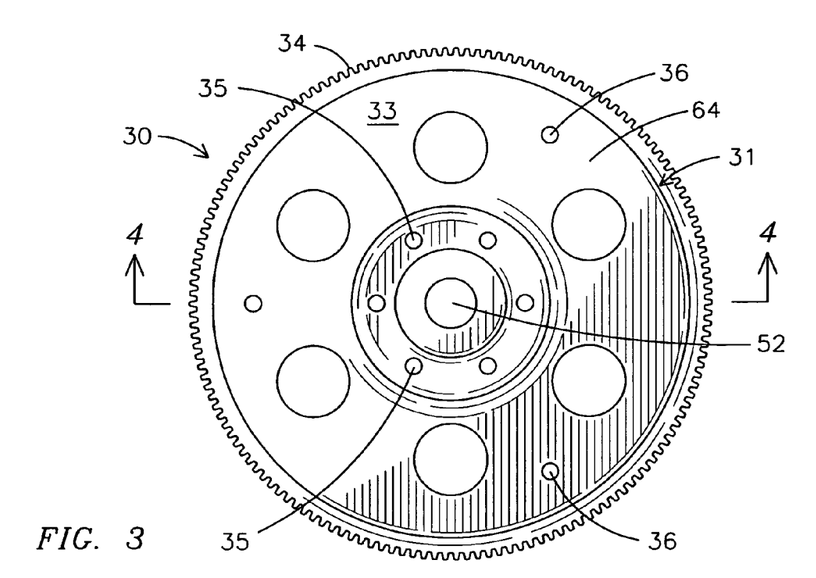
FIG. 3 is an elevational view of a second side, or transmission side, of the flexplate.

With respect to FIGS. 2 and 3, the flexplate 30 has two sets of apertures for mounting the flexplate 30 to the crankshaft 39 and to the torque converter 44. A first set, or first plurality of apertures 35, are spaced radially from and circumferentially around the boring 52. The apertures 35 are positioned on the body portion 31 so that each aperture 35 aligns with an aperture 43 on the crankshaft 39. Bolts 58, inserted through the apertures 35 and 43, secure the flexplate 30 to the crankshaft 39.

A second plurality of apertures 36 are spaced radially from the boring 52, and are disposed on the body portion 31 so that each aperture 36 aligns with an aperture 55 on the torque converter 44. In this embodiment, the apertures 35 are formed through the web section 64. As shown FIGS. 5 and 6, the torque converter 44 includes a housing 56 having mounting members or tabs 57 on which the apertures 55 are disposed. Bolts 59 secure the torque converter 44 to the flexplate 30. While the mounting members 57 are illustrated as tabs, other mounting members may be used. For example, some torque converters have a ring mounted to the converter housing, and apertures are disposed on the ring.

In the embodiment of the flexplate 30 described herein, the boring 52 has a first diameter D1 for receiving the first pilot hub 40 on the crankshaft 39, and a second diameter D2 for receiving the second pilot hub 46 on the torque converter 44. The first diameter D1 is slightly larger than an outside diameter of the first pilot hub 40, which is inserted in the boring 52 when the flexplate 30 is mounted to the crankshaft 39. For example the first pilot hub 40 typically has an outside diameter of 2.500 inches, so the boring 52 may have a first diameter D1 of about 2.502 inches so the first pilot hub 40 snugly fits within the boring 52.

Figure 4:
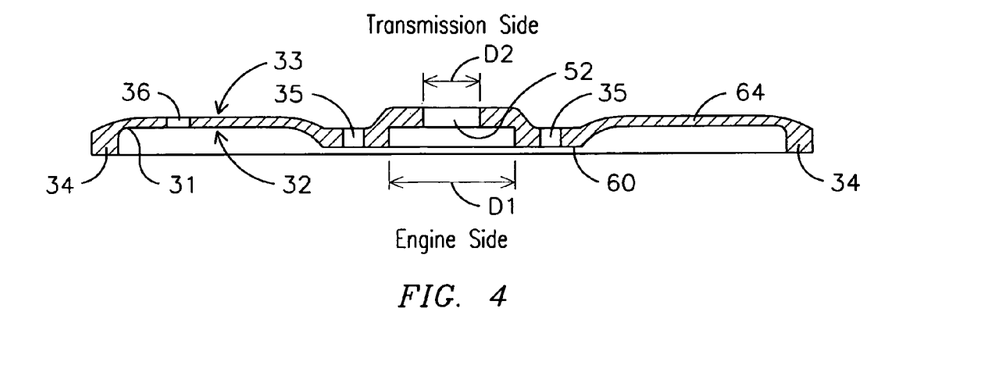
FIG. 4 is a section of the flexplate taken along line 4-4 in FIG. 3.

The boring 52 has a depth that is slightly longer than a length of the first pilot hub 40, so the body portion 31 of the flexplate 30 abuts the flange 42 on the crankshaft 39. As shown in FIGS. 2 and 4, the apertures 35 are disposed on a flange portion 60 of the body portion 31. The flange portion 60 is raised with respect to a surface of the first side 32 of the body portion 31 of the flexplate 30, and the flange portion 60 abuts the flange 42 on the crankshaft 39. The pilot hub 40 is typically about one quarter of an inch (¼") in length, and the depth of the boring 52 may be about five sixteenths of an inch (5/16") long, so the flange portion 60 on the flexplate abuts the flange 42 on the crankshaft 39.

The second diameter D2 of the boring 52 is slightly larger than an outside diameter of the second pilot hub 46 on the torque converter 44. For example, the outside diameter of a pilot hub on a torque converter is typically about 1.700 inches, in which case the second diameter D2 of the boring 52 may be about 1.702 inches. The first diameter D1 and second diameter D2 are dictated by the outside diameters of the first pilot hub 40 and second pilot 46, respectively. With respect to the embodiment illustrated in FIGS. 2 through 8, the first diameter D1 is larger than the second diameter D2; however, depending on the type of transmission 38 that is coupled to the engine 37, the first diameter D1 may be smaller than the second diameter D2, or the diameters D1 and D2 may be the same.

The thickness of the body portion 30 measured at the boring 52 may be about three quarters of an inch (¾") thick; the web section 64 between the flange portion 60 and gear teeth 34 may be about one eight of an inch (⅛") thick; the gear teeth 34 may be about three eighths of an inch (⅜") thick; and, the diameter of the flexplate 30 measured from an outside edge of the gear teeth 34 is about fourteen inches (14"). The flexplate 30 may be fabricated from known materials such as a mild steel or chrome-moly steel. The selected steel composition preferably has an SAE 1045 grade. The flexplate 30 is not limited by any of the above identified dimensions or materials which may vary according to specific applications.

Figure 5:
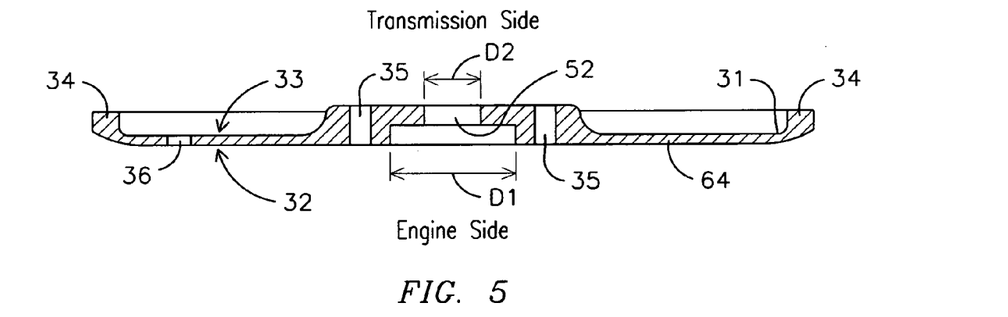
FIG. 5 is a sectional view of a second embodiment of the flexplate.
Figure 6:
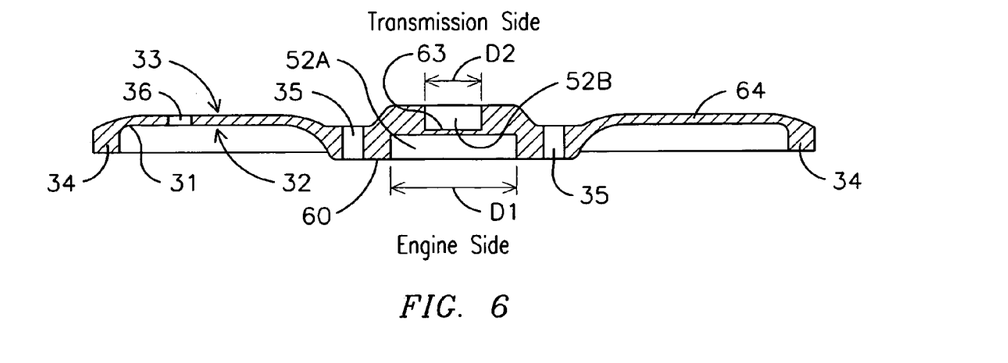
FIG. 6 is a sectional view of a third embodiment of the flexplate.

Two embodiments of the flexplate 30 are shown in FIGS. 5 and 6. With respect to FIG. 5, the first side 32, or engine side of the flexplate 30, has a substantially flat or planar surface that abuts the flange 42 on the crankshaft 39. In this embodiment the first side 32 does not have the raised flange portion 60 of the previously described embodiment.

With respect to FIG. 6, the boring 52 is represented as two borings 52A and 52B centered in the body portion 30. The first boring 52A is positioned on first side 32 of the body portion 30, and the second boring 52B is positioned second side 33 of the body portion 30. Instead of machining the boring 52 through the body portion 30, two borings 52A and 52B are machined to a predetermined depth with a partition 63 remaining between borings 52A and 52B.

Figure 7:
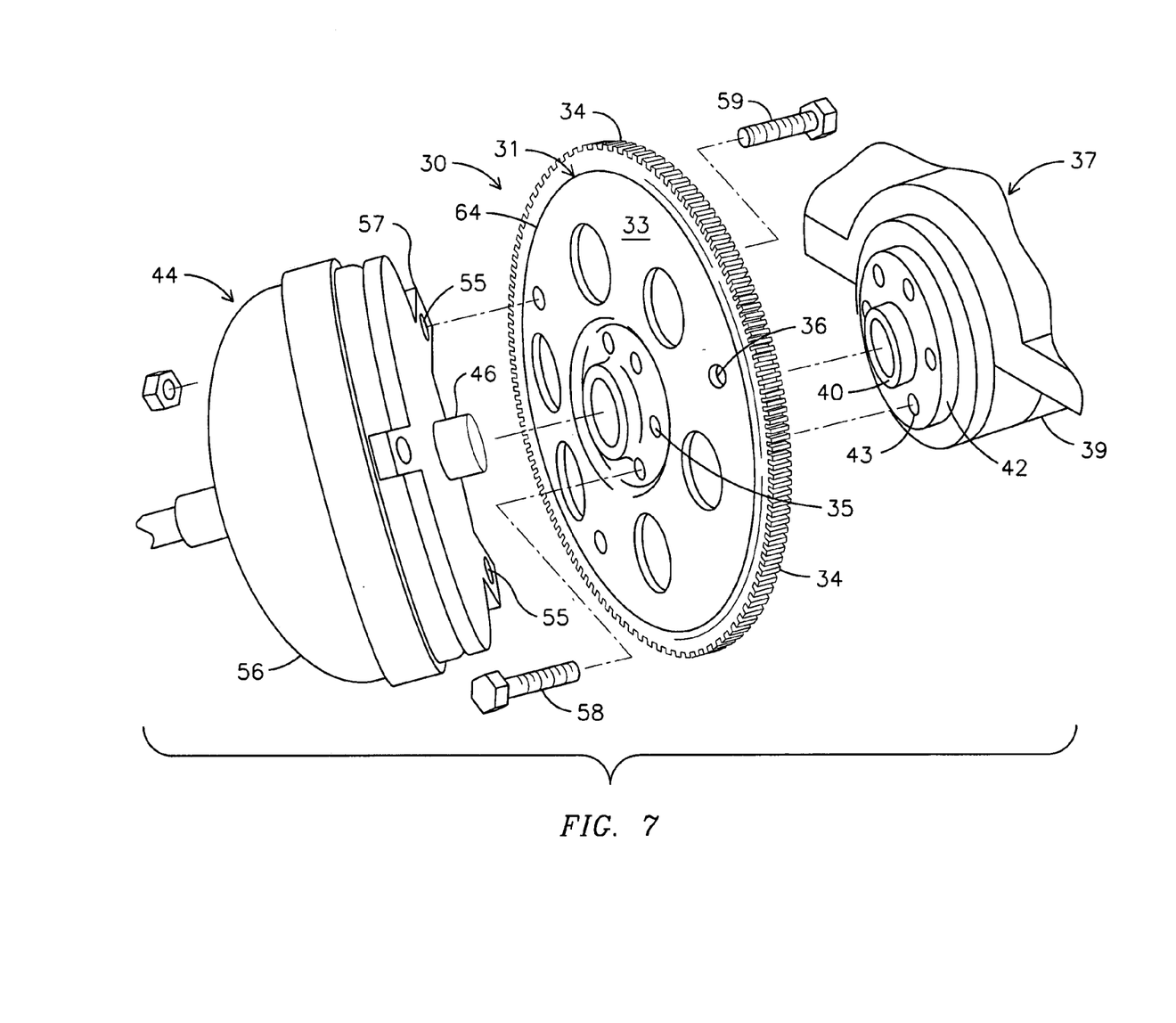
FIG. 7 is an expanded perspective view of the flexplate aligned with an engine and torque converter of a transmission unrelated to the engine.
Figure 8:
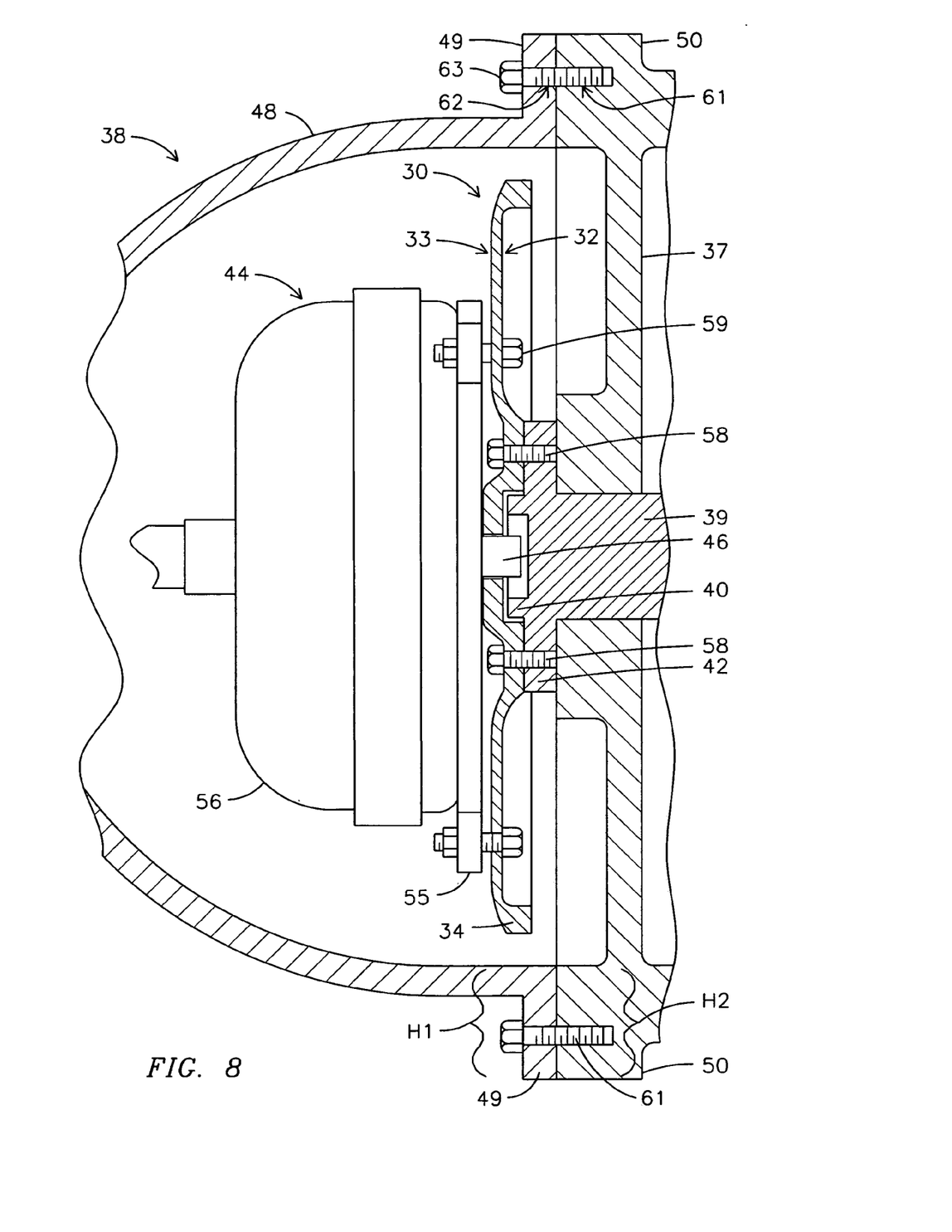
FIG. 8 is a top sectional view of the flexplate and system coupled to an engine and transmission unrelated to the engine.

With respect to FIG. 7, the flexplate 30 is shown coupled to the engine 37 and the unrelated transmission 38. In this particular embodiment, a transmission housing 48 is mounted to the engine 37 without the need of adaptors and/or spacers. The transmission housing 48 includes a flange 49 that corresponds to a flange 50 on the engine 37. More specifically, the flange 49 includes apertures 62 spaced and sized to align with apertures 61 on the engine flange 50. In addition, the transmission flange 49 is configured to match dimensions of the engine flange. For example, the transmission flange 49 has a height H1 and that is substantially the same as the height H2 of the engine flange 50. The width dimensions of the respective flanges may also be the same. Transmission housing 48 is secured to the engine 37 using bolts 63. The system shown in FIG. 6, including the flexplate 30 and transmission housing 48, eliminates the need for adaptors, spacers and extra bolts used in the prior art adaptor kits, and the problems associated with such kits.

While the preferred embodiments of the present invention have been shown and described herein, it will be obvious that such embodiments are provided by way of example only and not of limitation. Numerous variations, changes and substitutions will occur to those skilled in the art without departing from the teaching of the present invention. Although, the specification may be described in an application coupling an automobile engine to an unrelated transmission, the flexplate could be used in various other motor vehicles, and is not intended to be limited to use in an automobile. Accordingly, it is intended that the invention be interpreted within the full spirit and scope of the appended claims.

I claim as my invention the following:
1. A flexplate for coupling a motor vehicle engine to a transmission that is unrelated to the engine, the flexplate comprising:
    a single integral body portion having a generally circular shape, and the body portion having a first side and a second side;

one or more borings on the body portion, including a first boring on the first side of the body portion having a diameter corresponding to a diameter of a hub on a crankshaft on the engine and a second boring on the second side of the body portion having a diameter corresponding to a torque converter of the unrelated transmission;

wherein the first and second borings are coaxially aligned with one another;

a first set of apertures spaced radially outward from and circumferentially around the one or more borings and each aperture is aligned with respect to an aperture on a flange of the crankshaft for mounting the flexplate to the engine;

a plurality of gear teeth disposed along an outer periphery of the body portion;

the body portion having a web section disposed annularly around the one or more borings and between the one or more borings and the gear teeth; and, a second set of apertures on the web section spaced radially outward from one or more borings and each aperture is aligned with respect to an aperture on a mounting member of the torque converter for mounting the torque converter to the flexplate; and, wherein the torque converter is mounted directly to the flexplate and the flexplate is mounted to the engine without the use of an adapter disposed between the flexplate and torque converter, or between the flexplate and engine.

2. The flexplate of claim 1 wherein the diameter of the first boring is smaller than the diameter of the second boring.

3. The flexplate of claim 1 wherein the diameter of the first boring is larger than the diameter of the second boring.

4. The flexplate of claim 1 wherein the one or more borings includes a single boring formed through the body portion and centered thereon, and the diameter of the first boring is smaller than the diameter of the second boring.

5. The flexplate of claim 1 wherein the first and second borings includes a single boring formed through the body portion and centered thereon, and the diameter of the first boring is larger than diameter of the second boring.

6. The flexplate of claim 1 wherein the diameter of the first boring is smaller than the diameter of the second boring, and the flexplate having a partition disposed between the first boring and second boring.

7. The flexplate of claim 1 wherein the diameter of the first boring is larger than the diameter of the second boring, and the flexplate having a partition disposed between the first boring and second boring.

8. The flexplate of claim 1 further comprising a raised flange portion integrally formed on the first side of the body portion, and the one or more borings is formed in the flange portion and the first set of apertures are formed through the flange portion around the boring.

9. A system for coupling a motor vehicle engine to a transmission that is unrelated to the engine, the system comprising:

a flexplate having a single integral body portion having a generally circular shape, and the body portion having a first side and a second side, and one or more borings including a first boring on the first side of the body portion having a diameter corresponding to a hub of a crankshaft on the engine a second boring on the second side of the body portion corresponding to a torque converter of the unrelated transmission, and a plurality of gear teeth disposed along a periphery of the body portion of the flexplate;

wherein the torque converter is mounted directly to the flexplate and the flexplate is mounted to the engine without the use of an adapter disposed between the flexplate and torque converter, or between the flexplate and engine; and, a transmission bell housing having a flange portion on an end of the bell housing and a plurality of apertures spaced apart along the flange portion and the apertures are positioned on the flange for alignment with apertures on an engine flange.

10. The system of claim 9 further comprising a first set of apertures in the body portion of the flexplate spaced radially outward from the one or more borings and spaced circumferentially around the boring for mounting the flexplate to the crankshaft, and, a second set of apertures in the body portion spaced radially outward from the boring for mounting the torque converter to the flexplate.

11. The system of claim 9 wherein the diameter of the first boring is smaller than a diameter of the second boring.

12. The system of claim 9 wherein the diameter of the first boring is larger than a diameter of the second boring.

13. The system of claim 9 wherein the first and second borings on the flexplate include a single boring formed through the body portion and centered thereon, and the diameter of the first boring is larger than the diameter of the second boring.

14. The system of claim 9 wherein the one or more borings includes a single boring formed through the body portion and centered thereon, and the diameter of the first boring is smaller than a diameter of the second boring.

15. The system of claim 9 wherein the diameter of the first boring is smaller than a diameter of the second boring, and the flexplate having a partition disposed between the first boring and second boring.

16. The system of claim 9 wherein the diameter of the first boring is larger than a diameter of the second boring, and the flexplate having a partition disposed between the first boring and second boring.

17. The system of claim 9 wherein the flexplate further comprises a raised flange portion integrally formed on the first side of the body portion, and the first boring is formed in the raised flange portion and the first set of apertures are formed in the raised flange portion around the boring.

18. The system of claim 9 wherein the first side of the flexplate has a surface that is substantially planar.

19. The system of claim 9 wherein the flange portion of the transmission housing has one or more height dimensions matching one or more height dimensions of the flange on the engine.

20. An automobile, comprising:

an engine having a crankshaft;

a transmission, unrelated to the engine, and having a torque converter, and the torque converter having a second hub;

a flexplate having a single integral body portion having a generally circular shape, and the body portion having a first side on which the engine is coupled and a second side on which the transmission is coupled, and one or more borings including a first boring on the first side of the body portion that receives an end of the crankshaft on the engine on the first side and a second boring on the second side of the body portion that receives a torque converter of the unrelated transmission on the second side of the body portion;

a first set of apertures spaced radially outward from and circumferentially around the one or more borings and each aperture is aligned with respect to an aperture on a flange of the crankshaft for mounting the flexplate to the engine;

a plurality of gear teeth disposed along an outer periphery of the body portion;

the body portion having a web section disposed annularly around and between the one or more borings and the gear teeth;

a second set of apertures on the web section spaced radially outward from one or more borings and each aperture is aligned with respect to an aperture on a mounting member of the torque converter for mounting the torque converter to the flexplate; and, wherein the torque converter is mounted directly to the flexplate and the flexplate is mounted to the engine without the use of an adapter disposed between the flexplate and torque converter, or between the flexplate and engine.

21. The automobile of claim 20 wherein the crankshaft has a flange on the end thereof with a plurality of apertures on the flange that are circumferentially spaced on the flange, and the first set of apertures on the flexplate has a first set of apertures in the body portion spaced radially outward from and circumferentially around the one or more borings and are aligned with the apertures on the flange on the crankshaft.

22. The flexplate of claim 20 wherein the crankshaft has a first hub on an end thereof and the torque converter has a second hub, and one or more borings on the flexplate has a first diameter relative to a diameter of the first hub for receiving the crankshaft, and a second diameter relative to a diameter of the second hub on the torque converter for receiving the torque converter, and the first diameter is smaller than the second diameter.

23. The automobile of claim 20 wherein the crankshaft has a first hub on an end thereof and the torque converter has a second hub, and one or more borings on the flexplate has a first diameter relative to a diameter of the first hub for receiving the crankshaft, and a second diameter relative to a diameter of the second hub on the torque converter for receiving the torque converter, and the first diameter is larger than the second diameter.

24. The automobile of claim 20 wherein the first and second borings on the flexplate includes a single boring formed through the body portion and centered thereon, the diameter of the first boring is larger than the diameter of the second boring.

25. The automobile of claim 20 wherein the one or more borings on the flexplate includes a single boring formed through the body portion and centered thereon, and a diameter of the first boring is smaller than a diameter of the second boring.

26. The system of claim 20 wherein the one or more borings on the flexplate includes a first boring and a second boring, the first boring is formed on the first side of the body portion and centered thereon, and a diameter of the first boring is smaller than a diameter of the second boring.

27. The automobile of claim 20 wherein the first boring has a diameter relative to a diameter of the crankshaft, the second boring has a diameter relative to a hub on a torque converter, and a diameter of the first boring is larger than the diameter of the second boring, and each of the borings having a bottom and the flexplate having a partition disposed between the respective bottoms of the first boring and second boring.

28. The automobile of claim 20 wherein the first boring has a diameter relative to a diameter of the crankshaft, the second boring has a diameter relative to a hub on a torque converter for receiving the torque converter, and a diameter of the first boring is smaller than the diameter of the second boring, and each of the borings having a bottom and the flexplate having a partition disposed between the respective bottoms of the first boring and second boring.

29. The automobile of claim 20 wherein the flexplate further comprises a raised flange portion integrally formed on the first side of the body portion, and the one or more borings are formed in the flange portion and the first set of apertures are formed in the flange portion around the one or more borings, and the flange on the flexplate abuts the flange on the crankshaft.

30. The automobile of claim 20 wherein the first side of the flexplate has a surface that is substantially planar and abuts the flange on the crankshaft.

31. The automobile of claim 20 further comprising a flange portion on the engine, and the flange portion having a plurality of apertures spaced apart thereon, and a transmission bell housing having a flange portion on an end thereof and a plurality of apertures spaced apart along the flange portion of the bell housing and each aperture on the flange of the bell housing is aligned with a respective aperture on the flange of the engine.

32. The automobile of claim 20 wherein the flange portion of the transmission housing has one or more height dimensions matching one or more height dimensions of the flange on the engine.

33. A flexplate for coupling an automobile engine to a transmission that is unrelated to the engine, wherein the engine has a crankshaft with a hub and flange on an end of the crankshaft, the flange has apertures spaced radially outward from and circumferentially around the hub for mounting the flexplate to the crankshaft and the unrelated transmission includes a torque converter having a hub and one or more mounting members thereon and apertures through mounting members for mounting the torque converter the flexplate comprising:

a body portion having a generally circular shape, and the body portion having a first side, a second side and gear teeth disposed on an outer periphery of the body portion;

a first boring formed in the first side of the body portion having a diameter corresponding to the hub on the crankshaft of the engine;

a second boring formed in the second side of the body portion having a diameter corresponding to the hub on the torque converter of the unrelated transmission, and the second boring is coaxially aligned with the first boring;

a first set of apertures spaced radially outward from and circumferentially around the first boring and each aperture is aligned with respect to an aperture on the flange of the crankshaft for mounting the flexplate to the engine;

the body portion having a web section disposed annularly around the first boring and second boring and between the first set of apertures and the gear teeth;

a second set of apertures in the web section spaced radially outward from the first boring and second boring and each aperture is aligned with respect to an aperture on the mounting member of the torque converter for mounting the torque converter to the flexplate; and, wherein the torque converter is mounted directly to the flexplate and the flexplate is mounted to the engine without the use of an adapter disposed between the flexplate and torque converter, or between the flexplate and engine.

34. The flexplate of claim 33 wherein the first boring and second boring are contiguous.

35. The flexplate of claim 33 further comprising a partition disposed between the first boring and second boring.

36. The flexplate of claim 33 further comprising a raised flange portion on the first side of the body portion.

37. The flexplate of claim 33 wherein the diameter of the first boring is smaller than the diameter of the second boring.

38. The flexplate of claim 33 wherein the diameter of the first boring is larger than the diameter of the second boring.

\* \* \* \* \*